United States Patent
Fan et al.

(10) Patent No.: US 9,384,221 B2
(45) Date of Patent: Jul. 5, 2016

(54) UNLIMITED RETROACTIVE DATA ELEMENT DIMENSION WIDENING

(71) Applicant: Google Inc., Mountain View, CA (US)

(72) Inventors: Jieyan Fan, Fremont, CA (US); Cedric Ho, Mountain View, CA (US); Yuan Zhuge, Fremont, CA (US); Sagnik Nandy, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 334 days.

(21) Appl. No.: 13/926,300

(22) Filed: Jun. 25, 2013

(65) Prior Publication Data

US 2016/0034498 A1 Feb. 4, 2016

(51) Int. Cl.
*G06F 7/00* (2006.01)
*G06F 17/30* (2006.01)

(52) U.S. Cl.
CPC .............................. *G06F 17/30292* (2013.01)

(58) Field of Classification Search
None
See application file for complete search history.

(56) References Cited

U.S. PATENT DOCUMENTS

| | | | |
|---|---|---|---|
| 6,847,973 B2 * | 1/2005 | Griffin | G06F 17/30592 |
| 7,113,951 B2 * | 9/2006 | Ashida | G06F 17/30592 |
| | | | 707/803 |
| 7,603,331 B2 * | 10/2009 | Tuzhilin et al. | 706/45 |
| 8,037,108 B1 | 10/2011 | Chang | |
| 8,271,514 B2 | 9/2012 | Geva | |
| 8,275,762 B2 | 9/2012 | Gupta et al. | |
| 8,364,628 B2 | 1/2013 | Kulkarni et al. | |
| 2003/0014394 A1 * | 1/2003 | Fujiwara | G06F 17/30595 |
| 2008/0016041 A1 * | 1/2008 | Frost et al. | 707/3 |
| 2011/0054854 A1 * | 3/2011 | Williamson | 703/2 |
| 2011/0107254 A1 * | 5/2011 | Moroze | 715/782 |
| 2013/0024226 A1 * | 1/2013 | Bourke | 705/7.12 |
| 2013/0103658 A1 | 4/2013 | Travis | |

* cited by examiner

*Primary Examiner* — Robert Beausoliel, Jr.
*Assistant Examiner* — Michael Pham
(74) *Attorney, Agent, or Firm* — Foley & Lardner LLP; John D. Lanza

(57) ABSTRACT

Systems and methods for retroactively performing dimension widening on a data element are provided. A described method includes receiving a set of data elements from a database and a set of dimension widening rules. The method further includes identifying one or more of the data elements to which any of the dimension widening rules are applicable. The method further includes processing the identified data elements by applying the applicable dimension widening rules to the identified data elements. A dimension widening delta is generated for each data element, and the dimension widening deltas may be stored. The method further includes merging one or more of the data elements with one or more of the dimension widening deltas in response to a query.

20 Claims, 4 Drawing Sheets

UNLIMITED RETROACTIVE DATA ELEMENT DIMENSION WIDENING

BACKGROUND

Analytical reporting systems are often used to measure and assess the effectiveness of a content distribution campaign (e.g., a campaign in which content items are distributed to a user device via a computer network) or other types of electronic interactions (e.g., website visits, electronic commerce, etc.). For example, in a content distribution campaign, an analytical reporting system can be used to generate reports for evaluating the effectiveness of distributed content items (e.g., impressions, hits, clicks, conversions, revenue, etc.). The reports may be generated by aggregating pre-defined keys from a set of raw data. In this context, a "report" is defined as a combination of keys and values. Typically, a data element needs to include all of the pre-defined keys and values of a particular report to be included in the report.

Dimension widening is a process by which keys and/or values are created or edited based on the values of other keys and a predefined mapping schema. For example, a customer may pre-define mappings from any keys (i.e., "condition keys") to other keys (i.e., "action keys") and other values (i.e., "action values"). Dimension widening can be used to automatically generate keys and/or values for a data entry such that the data element may be included in a report.

One challenge with dimension widening is the scale of the process. With a large number of dimension widening rules (e.g., mapping rules and conditions) and data elements to process, it is non-trivial to join such large data sets without introducing significant latency in the reporting process.

Further, it is challenging to apply dimension widening retroactively. Data is often preprocessed and/or preaggregated to reduce processing latency at the time of query (i.e., at the time a customer requests a report). However, if data has been preprocessed, applying dimension widening retroactively may cause a modification in the underlying raw data, thereby causing the preprocessed data to become outdated. Traditional solutions have included performing a massive reaggregation and preprocessing of the updated (e.g., dimension-widened) data or performing the dimension widening at query time. However, these solutions often require significant processing power and computing resources (e.g., CPU resources, disk IO resources, etc.), and can introduce significant query latency. Further, applying dimension widening to preprocessed data may result in a loss of information associated with the original raw data.

SUMMARY

One implementation of the present disclosure relates to a computer-implemented method for retroactively defining values of data element dimensions for use in an analytical report. The method includes receiving, at a processing circuit, a set of data elements from a database, each of the data elements having one or more dimensions. The method further includes receiving, at a processing circuit, a set of dimension widening rules, each of the dimension widening rules including one or more conditions and one or more actions. The set of dimension widening rules includes a potentially unlimited number of dimension widening rules.

The method further includes identifying, by the processing circuit, one or more of the data elements to which any of the dimension widening rules are applicable, wherein a dimension widening rule is applicable to a data element if the one or more dimensions of the data element satisfy the one or more conditions of the dimension widening rule. The method further includes processing, by the processing circuit, the identified data elements by applying the applicable dimension widening rules to the identified data elements, wherein the processing circuit generates a dimension widening delta for each of the processed data elements. The method further includes storing the dimension widening deltas for each of the processed data elements in the database, wherein the dimension widening delta for a data element is stored separately from the data element in the database. The method further includes merging one or more of the data elements with one or more of the dimension widening deltas in response to a query requesting a dimension of the one or more of the data elements.

Each of the one or more conditions and each of the one or more dimensions may have a name and a value. A dimension of a data element satisfies a condition of a dimension widening rule if the name of the data element dimension satisfies the name of the condition and the value of the data element dimension satisfied the value of the condition.

In one implementation, the set of data elements is a set of aggregated data, wherein applying the dimension widening rules to the set of aggregated data generates delta aggregates. The delta aggregates are stored separately from the aggregated data and are generated without reaggregating the aggregated data.

In one implementation, the set of data elements is a set of raw data elements stored in a first database. The method may further include processing the set of raw data elements to generate a set of aggregates and storing the set of aggregates in a second database, separate from the first database. The method may further include receiving additional raw data elements and storing the additional raw data elements in the first database. Identifying one or more of the data elements to which any of the dimension widening rules are applicable includes identifying one or more of the aggregates and one or more of the additional raw data elements to which any of the dimension widening rules are applicable. Applying the applicable dimension widening rules to the identified data elements includes applying the dimension widening rules to the one or more identified aggregates and to the one or more identified additional raw data elements, wherein the processing circuit generates a dimension widening delta for each of the processed aggregates and for each of the processed additional raw data elements. Storing the dimension widening deltas for each of the processed data elements includes storing the dimension widening deltas for the additional raw data elements in the first database and storing the dimension widening deltas for the aggregates in the second database.

In one implementation, processing the identified data elements by applying the dimension widening rules to the identified data elements occurs prior to receiving the query requesting a dimension of the one or more of the data elements.

Those skilled in the art will appreciate that the foregoing summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
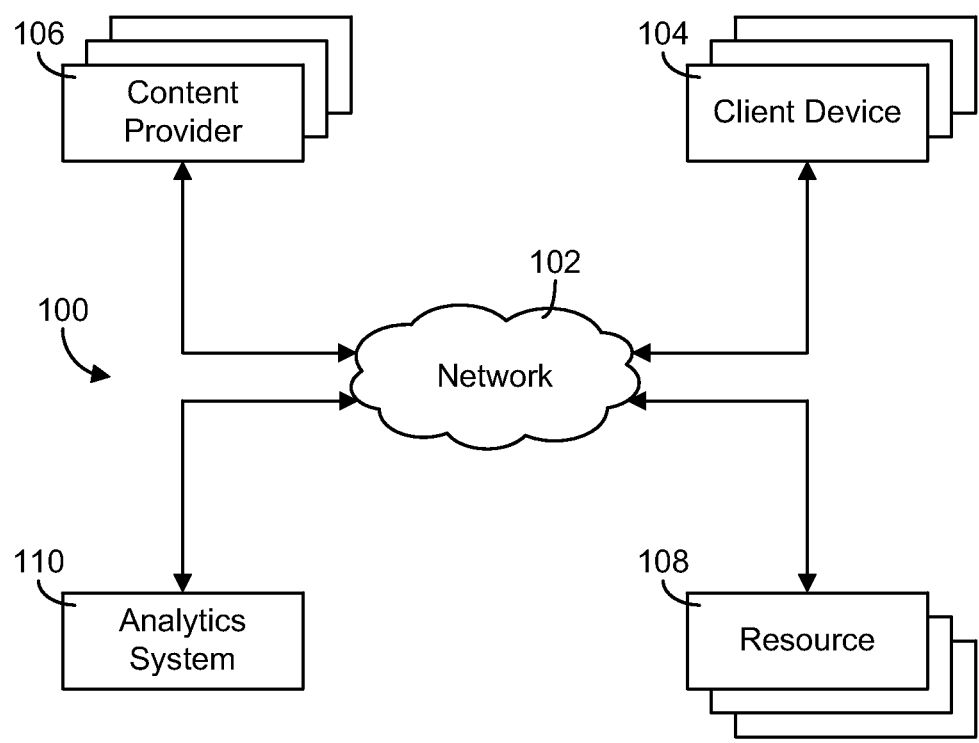
FIG. 1 is a block diagram of a computer system including a network, resources, content providers, user devices, and an analytics system, according to a described implementation.

Analytic systems may generally be used to allow a customer (e.g., a content provider) to monitor and assess various types of performance. For example, the customer may have a campaign in which content items are distributed for display on a resource (e.g., providing advertisements on a website). The analytics system may be used to measure and assess performance of the distributed content items (e.g., by generating an analytical report). In this context, a "report" may be defined as a combination of keys and values. Typically, a data entry needs to include all of the keys and values associated with a report to be included in the report.

For example, a report may include the keys "product_code," "product_name," and the values "price" and "quantity." Using dimension widening, customers may pre-upload their product catalogue which defines a mapping schema from product_code to product_name, price, and quantity. Advantageously, for each raw data entry, customers only need to set product_code, and the analytics system joins the two data sets (the customer's dimension widening data and the raw data) by automatically adding an appropriate product_name, price, and quantity to the raw data, based on the mapping schema.

In general, dimension widening may be used to save time and effort relating to detailing information. For example, when a user interacts with a content item, a data element indicating the "hit" may be sent to an analytics system indicating the interaction. Instead of tagging the hit with information relating to the interaction, the data element may be associated with a product code or other code. Dimension widening rules may then be applied to multiple data elements at a later time in order to provide sufficient information relating to the hit. Without dimension widening, content providers would have to tag all customized fields related to a hit.

Referring generally to the FIGURES, systems and methods for applying a potentially unlimited number of dimension widening rules to a dataset without affecting query-time (e.g., reporting) latency are shown. The systems and methods described herein may be used to apply dimension widening rules to dataset without adversely affecting the time required to generate a report. Advantageously, the dimension widening may be performed at the processing stage (e.g., as the data is collected) rather than when a query is submitted by the user. This allows very large datasets (e.g., on the order of gigabytes) to be joined without negatively affecting the user experience.

As data elements are collected, the data elements may be analyzed to determine whether the data requires dimension widening. For example, a data element may be compared with a set of dimension widening rules. The dimension widening rules may include "conditions" which may be satisfied by a data element and "actions" to perform if the conditions are met. Advantageously, data elements which satisfy or potentially satisfy one or more dimension widening rules may be stored separately from other data elements. The dimension widening rules may be applied only to the data elements previously identified as requiring dimension widening, thereby eliminating any potential processing latency with respect to the remaining data (e.g., data which does not require dimension widening).

In some implementations, dimension widening rules are applied retroactively to preprocessed and/or aggregated data. Dimension widening may be performed with respect to not only raw data but also aggregated data. Advantageously, the dimension-widened aggregated data may not replace the existing aggregated data. The dimension-widened aggregated data may be stored alongside the non-widened aggregated data. In this description, the widened aggregated data may be referred to as "delta aggregates." If a query is served by one of the data elements having both aggregated data and delta aggregates, the aggregated data and the delta aggregates may be merged at query time.

Referring now to FIG. 1, a block diagram of a computer system 100 is shown, according to a described implementation. Computer system 100 is shown to generally include a network 102, client devices 104, content providers 106, resources 108, and an analytics system 110. System 100 may facilitate communication between client devices 104, content providers 106, resources 108, and analytics system 110. For example, analytics system 110 may provide a report to a content provider 106 when a user associated with the content provider requests a report. Analytics system 110 may receive data from one or more of client devices 104, content providers 106, and resources 108 for the report. For example, analytics system 110 may receive data relating to content items displayed on a client device 104 (e.g., content items received from a content provider 106), process and aggregate the data, and provide the data in a report to a user.

System 100 is shown to include a network 102. Network 102 may be any form of computer network that relays information between client devices 104, content providers 106, resources 108, and analytics system 110. For example, network 102 may include the Internet and/or other types of data networks, such as a local area network (LAN), a wide area network (WAN), a cellular network, a satellite network, a radio network, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, analytics system 110 may communicate wirelessly (e.g., via WiFi, cellular, radio, etc.) with a transceiver that is hardwired (e.g., via a fiber optic cable, a CAT5 cable, etc.) to a computing device of network 102.

System 100 is shown to include client devices 104. Client devices 104 may communicate with other computing devices via network 102. Client devices 104 may execute a web browser or other application (e.g., a video game, a messenger program, a media player, a social networking application, etc.) to retrieve content from other devices over network 102. For example, client devices 104 may communicate with any number of content providers 106 and resources 108. Content providers 106 and resources 108 may provide webpage data and/or other content, such as images, video, and audio, to client devices 104. One or both of content providers 106 and resources 108 may be configured to select third-party content to be provided to client devices 104. For example, a resource 108 may be configured to provide a first-party webpage to client device 104 that includes additional third-party content provided by a content provider 106.

Client devices 104 may be any number of different types of user electronic devices configured to communicate via network 102 (e.g., a laptop computer, a desktop computer, a tablet computer, a smartphone, a digital video recorder, a set-top box for a television, a video game console, combinations thereof, etc.) and may be a mobile device or non-mobile device. Client devices 104 may include a user interface element (e.g., an electronic display, a speaker, a keyboard, a mouse, a microphone, a printer, etc.) for presenting content to a user, receiving user input, or facilitating user interaction.

System 100 is shown to include content providers 106. Content providers 106 may include one or more electronic devices representing advertisers, resource operators, business owners, or other entities. In some implementations, content providers 106 may produce content items for presentation to client devices 104. In some implementations, the content items may be advertisements. The advertisements may be display advertisements such as image advertisements, Flash® advertisements, video advertisements, text-based advertisements, or any combination thereof. In other implementations, the content items may include other types of content which serve various non-advertising purposes. The content items may be displayed in a content slot of a resource 108 and presented (e.g., alongside other resource content) to client devices 104.

Content providers 106 may request and receive a report from analytics system 110 as generally described in the present disclosure. While the implementation shown in FIG. 1 describes analytics system 110 providing the report to content providers 106, it should be understood that the report may be provided to any user of a client device that requests the report. For example, a user associated with content provider 106 may request and receive the report. The client device of the user may generally include an application (e.g., web browser, resource renderer, etc.) for converting the report (or other electronic content) into a user-comprehensible format (e.g., visual, aural, graphical, etc.).

System 100 is shown to include resources 108. Resources 108 may include any type of information or data structure that can be provided over network 102. In some implementations, resources 108 may be identified by a resource address associated with each resource (e.g., a uniform resource locator (URL)). Resources 108 may include web pages, word processing documents, portable document format (PDF) documents, images, video, programming elements, interactive content, streaming video/audio sources, or other types of electronic information. Resources 108 may include content (e.g., words, phrases, images, sounds, etc.) having embedded information (e.g., meta-information embedded in hyperlinks) and/or embedded instructions. Embedded instructions may include computer-readable instructions (e.g., software code, JavaScript®, ECMAScript®, etc.) which are executed by client devices 104 (e.g., by a web browser running on client devices 104).

One or more of content providers 106, resources 108, or a content selection service may be configured to select third-party content for a client device 104. In one implementation, the selected third-party content may be provided to client devices 104 through a content provider 106 via network 102. The third-party content may be presented in conjunction with first-party content from a resource 108. In other implementations, a content selection service may provide instructions to a client device 104 that causes the user device to retrieve the selected third-party content (e.g., from a memory of client device 104, from a content provider 106, etc.). Content may be selected based on a device identifier of the user device, in one implementation. A device identifier may generally refer to any form of data that may be used to represent a device or software that receives content to be presented. Content may further be selected based on history data of a client device 104 (e.g., data associated with an online event such as visiting a webpage, interacting with presented content, conducting a search, making a purchase, downloading content, etc.). Content may further be selected based on other activities, such as a content auction. For example, a real-time content auction may be conducted in response to a client device 104 requesting first-party content from a resource 108.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from a content server that may be more relevant to the user. In addition, certain data may be treated (e.g., by analytics system 110) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by client devices 104, etc.) and used by analytics system 110.

In some implementations, one or more of client devices 104, content providers 106, and resources 108 may report behavioral data including one or more metrics to analytics system 110. Behavioral data may include website traffic data, conversion data (e.g., conversion type, amount spent, etc.), click-through-path data (e.g., content impressions, clicks, or other interactions responsible for a conversion event), resource visit/download data, user account-related data, content item data (e.g., impressions, clicks, conversions, etc.), content selection data (e.g., content slot information, number/type of content requests, delivered content items, etc.), resource data, landing page data, or other types of data describing interactions between client devices 104, content providers 106, and resources 108.

Analytics system 110 may be generally configured to receive, aggregate, and process data. Analytics system 110 may generate a report to provide to content providers 106 or other users based on the data. Analytics system 110 may generate any type of report relating to the data. For example, analytics system 110 may receive data relating to the performance of content items such as advertisements on a webpage or other resource. The data may be aggregated and processed, and used to generate a report indicating the performance (e.g., revenue, number of views, etc.) of the advertisements. Content item performance may be measured based on, for example, a number of impressions of the content item, a number of clicks by a user, number of conversions, an amount spent associated with each conversion, etc., or based on other metrics describing the behavior of a user device (e.g., device usage information, software configuration, user profile information, geographic location, installed applications, etc.) consuming the content item. Analytics system 110 may be configured to format the report such that the user may interact with the report and such that the report is viewable on any type of user device.

While analytics system 110 is shown as a single entity or device in FIG. 1, it should be understood that the activities of analytics system 110 may be split between multiple devices. For example, any of the aggregation or processing steps performed by analytics system 110 may be performed on multiple devices (e.g., data may be received and processed by multiple devices, a reporting generation process may use processed data stored at different devices, etc.).

Figure 2:
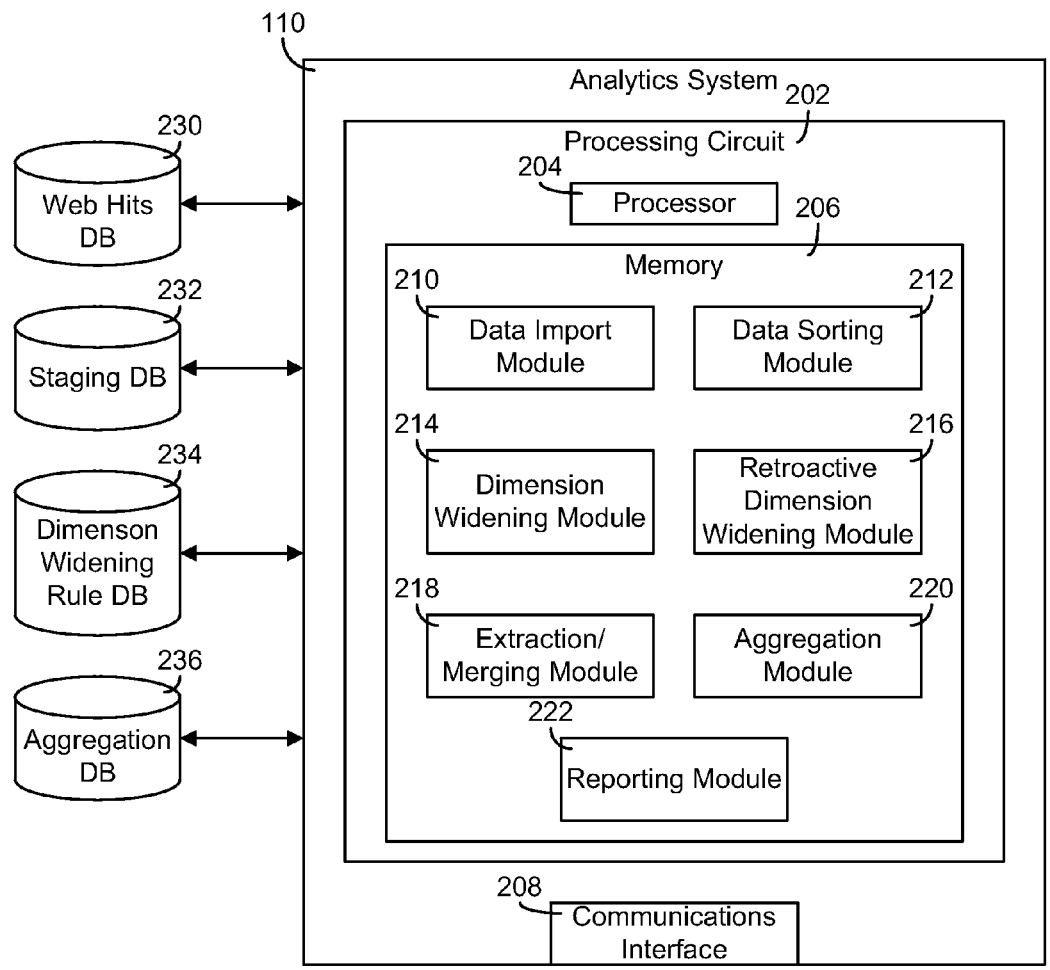
FIG. 2 is a more detailed block diagram of the analytics system of FIG. 1, according to a described implementation.

Referring to FIG. 2, a more detailed block diagram of analytics system 110 is shown, according to a described implementation. Analytics system 110 may generally be configured to receive a set of data elements and to process the data elements by applying dimension widening rules to the data elements. The data elements may be descriptive of a content item displayed for a user of a client device 104. Analytics system 110 may use the processed data to generate requested reports.

In some implementations, the reports may be requested by a content provider to view and analyze metrics relating to one or more content items. For example, the content provider may have a campaign that presents content items to users on a website, and the report may provide information relating to the performance of the content (e.g., the number of views of the content item, the interaction between a user and the content item, etc.). In the description of the present disclosure, reports are described as being provided to users, who may be customers who are associated with one or more content items being included in the report. It should be understood that any type of user (e.g., a user associated with a content provider, a third-party catalog service not associated with the content items in the port) may provide dimension widening rules and request and receive reports from analytics system 110.

Analytics system 110 may generally receive a set of data elements from one or more of user devices 104, content providers 106, resources 108, or another source. The set of data elements may relate to a content item, according to a described implementation. For example, a data element may relate to a particular advertisement displayed on a user device. The data element may include one or more dimensions. Dimensions may identify a particular content item or describe one or more metrics relating to the performance of the content item. For example, a dimension may specify a unique ID associated with a particular content item. Another dimension may indicate a time at which the content item was distributed. A third dimension may describe an attribute of the content item (e.g., hyperlink URL, display size, etc.).

In other implementations, the data elements may relate to physical products or services. For example, a data element may describe attributes of a particular product (e.g., serial number, model number, color, price, etc.) exchanged between users. Analytics system 110 may be used to evaluate business performance by reporting sales trends, revenue, profitability, inventory, or other metrics relevant to physical products and/or services.

Analytics system 110 may further receive a set of dimension widening rules as described below. The dimension widening rules may be generally used to expand a data element by introducing additional fields to the data elements. For example, if a data element includes a "product ID" attribute, the dimension widening rules may be used to add additional attributes to the data element based on the product ID. The dimension widening rules may define a mapping between product ID and other dimensions/attributes (e.g., color, price, model number, etc.). The dimension widening rules may be provided by a customer (e.g., a content provider, a distributor, a retailer, etc.) or otherwise. In some implementations, the dimension widening rules may be imported from third-party sources (e.g., product catalogs) rather than or in addition to the customer.

Still referring to FIG. 2, analytics system 110 is shown to include a communications interface 208 and a processing circuit 202. Communications interface 208 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 208 may allow analytics system 110 to communicate with network 102, client devices 104, content providers 106, and resources 108.

Processing circuit 202 is shown to include a processor 204 and memory 206. Processor 204 may be implemented as a general purpose processor, an application specific integrated circuit (ASIC), one or more field programmable gate arrays (FPGAs), a CPU, a GPU, a group of processing components, or other suitable electronic processing components.

Memory 206 may include one or more devices (e.g., RAM, ROM, Flash® memory, hard disk storage, etc.) for storing data and/or computer code for completing and/or facilitating the various processes, layers, and modules described in the present disclosure. Memory 206 may include volatile memory or non-volatile memory. Memory 206 may include database components, object code components, script components, or any other type of information structure for supporting the various activities and information structures described in the present disclosure. In some implementations, memory 206 is communicably connected to processor 204 via processing circuit 202 and includes computer code (e.g., data modules stored in memory 206) for executing one or more processes described herein. In brief overview, memory 206 is shown to include a data import module 210, a data sorting module 212, a dimension widening module 214, a retroactive dimension widening module 216, an extraction/merging module 218, an aggregation module 220, and a reporting module 222.

Still referring to FIG. 2, and in greater detail, memory 206 is shown to include a data import module 210. Data import module 210 is configured to receive an input relating to dimension widening rules from a user (e.g., a content provider, a third-party catalog service, etc.) and to store in the input in a dimension widening rule database 234. For example, a user may provide dimension widening rules relating to one or more data elements associated with the content provider. As another example, a third-party catalog service (e.g., independent of a customer) may provide dimension widening rules that are not explicitly given by customers (e.g., mapping from a product SKU to product name, price, etc.).

A user may define dimension widening rules for reports received by the user. The dimension widening rules may generally be used to determine whether a dimension of a data element matches a certain criteria (e.g., a "rule condition"). If so, additional dimensions (e.g., additional properties, additional attributes, etc.) may be added to the data element. For example, a data element may include a dimension "product_code." The dimension widening rules may be applied to the data element to add the dimension "product_name" or "price" to the data element. The dimension widening rules may support the addition of standard dimensions (e.g., dimensions supported by analytics system 110) or custom dimensions specified by a user.

The dimension widening rules generally include one or more condition dimensions and action dimensions. The condition dimensions indicate dimensions of the data element which, if satisfied by a rule condition, qualify the data element for dimension widening. For example, a rule condition may identify data elements having a "product_code" satisfying a condition value. Condition values may be numerical (e.g., product_code=1, etc.), alphanumeric, or other values potentially included in a condition dimension.

Action dimensions indicate one or more changes to a dimension, or the addition of one or more dimensions, to the data element (e.g., adding the dimension "product_name," changing the "product_code," etc.) if the rule conditions for a given rule are satisfied. It may be possible for a dimension in the dimension widening rules to be both a condition dimension and an action dimension. For example, a rule may specify that if the "product_code" is ABC, then the "product_code" should be set to XYZ. In this example "product_code" is both a condition dimension and action dimension.

A user may import the rules to data import module 210 in any type of method. In one implementation, analytics system 110 may provide a user interface on a client device allowing a user to enter dimension widening rules in any format. In another implementation, the dimension widening rules may be imported through an application programming interface (API). In some implementations, the user may upload a file (e.g., a comma-separated values (CSV) file) containing the dimension widening rules. The dimension widening rules in the CSV file may be formatted such that the first row is the schema of the file and subsequent rows are dimension widening rules.

Data import module 210 interprets the input from the user and stores the input in a standard format in dimension widening rule database 234. An example table entry of dimension widening rule database 234 is shown below:

```
schema { mapping_schema {
    conditions { name: "product_code" }
    action_dimensions { name: "product_name" }
    action_metrics { name: "product_revenue" }
    action_metrics { name: "custom_metric" index: 1 }
}}
rules { mapping_rule {
    conditions: "1" //product_code
    dimension_actions: "shoe" //product_name
    metric_actions: 5 //product_revenue
    metric_actions: 10 //cm_1
}}
rules { mapping_rule {
    conditions: "2"
    dimension_actions: "bag"
    metric_actions: 500
    metric_actions: 1000
}}
```

The first line of the table defines the mapping schema of the dimension widening rule. The mapping schema defines the names of the conditions and dimensions to which the subsequent dimension widening rules apply. For example, the mapping schema above provides that if the "product_code" satisfies some condition, action should be taken with respect to the dimension "product_name" and the metrics "product_revenue" and "custom_metric." The other rows of the table define the dimension widening rules. For example, the first rule indicates that if the "product_code" of a data element is 1, then the "product_name" dimension should be set to "shoe," the "product_revenue" dimension should be set to 5, and the "custom_metric" dimension should be set to 10.

In one implementation, data import module 210 may be configured to sort the dimension widening rules. For example, data import module 210 may generate a signature for each dimension widening rule. The signature may be computed based on values of the condition dimensions of the dimension widening rules. The signature may be stored with the rules in dimension widening rule database 234. Other modules (e.g., dimension widening module 214) may then retrieve one or more dimension widening rules from database 234 (e.g., using a binary search on the signatures of each rule).

In one implementation, dimension widening rules may be sorted based on a concatenation of an account ID of the user, a log number, a data source ID, or any other identifier associated with a content item, group of content items, one or more users, or one or more content providers.

In one implementation, data import module 210 may be configured to allow a user to define a partial key as a condition dimension for the dimension widening rules. For example, a user may define a regular expression to extract a partial key from a data element and to use the partial key as a condition dimension for the dimension widening rules. In other words, for any data element dimension including a character string, the dimension widening rules may include a partial match condition specifying a sequence of characters. The partial match condition may be satisfied if the character string includes the sequence of characters. The partial matching feature may be especially useful for URL-based condition dimensions, as users may specify one query parameter or path segment of the URL instead of specifying an entire URL. For example, the URL:

http://www.example.com/purchase?product_code=1234&other_key=5678 can be parsed and the value of the "product_code" (e.g., 1234) may be extracted and used as a condition in the dimension widening rule.

Still referring to FIG. 2, memory 206 is shown to include a data sorting module 212. Data sorting module 212 is configured to receive data elements. The data elements may be imported in the same manner as the dimension widening rules (e.g., via data import module 210) or using a separate data acquisition system. In some implementations, the data elements may be associated with a content item. For example, when a user device interacts with a content item (e.g., when an advertisement is displayed on a website, when a user clicks on the advertisement, when a conversion occurs after a user clicks on the advertisement, etc.), data representative of the interaction may be sent to data sorting module 212. Data sorting module 212 may receive the data in an ad-hoc manner. The data may be logged and then processed by data sorting module 212.

Data sorting module 212 may be a task manager based pipeline that checks if the raw data have dimensions satisfying the conditions of any of the rules stored in dimension widening rule database 234. For example, data sorting module 212 may determine if a data element in the raw data has dimensions corresponding to the dimension widening rules. In one implementation, a data element may be regarded as needing dimension widening if the data elements contains all of the condition dimensions in a set of dimension widening rules (e.g., if a data element has a "product_code" dimension value matching the "product_code" value for a set of dimension widening rules). In other words, if the name of the data element dimension satisfies the name of a condition of the dimension widening rules, and the value of the data element dimension satisfies the value of the condition of the dimension widening rules, then the dimension of the data elements satisfies the condition of the dimension widening rule, and the data element is marked for dimension widening.

Data sorting module 212 sorts incoming data into data that requires dimension widening and data that does not require dimension widening based on the dimension widening rules. Data which requires dimension widening is stored in a staging database 232. Staging database 232 may be configured to store data to be processed by dimension widening module 214. Data which does not require dimension widening may be stored in a web hits database 230. Web hits database 230 may be configured to store data for use in generating an analytical report (e.g., by reporting module 222). In some implementations, data sorting module 212 is an optional component. For example, all incoming data may be stored in a single database (e.g., without presorting).

Still referring to FIG. 2, memory 206 is shown to include a dimension widening module 214. Dimension widening module 214 may be configured to retrieve data from staging database 232 and to perform dimension widening on the data using dimension widening rules from database 234. Advantageously, in some implementations, dimension widening module 214 may be configured to apply dimension widening rules only to data in staging database 232 and not data stored in web hits database 230. This configuration may ensure that the dimension widening process does not impact processing latency of the data that does not require dimension widening (e.g., data in web hits database 230). In other implementations, dimension widening module 214 may apply the dimension widening rules to data elements in both web hits database 230 and staging database 232.

Dimension widening module 214 may be a task manager based pipeline capable of performing multiple functions. Dimension widening module 214 may generate a list or table of data elements to be processed. The data elements in the list or table may be collocated such that data for the same customer (e.g., data relating to a particular content item or group of content items, data associated with a particular user, advertiser, business owner, etc.) are grouped together. In some implementations, dimension widening module 214 may be configured to load only data associated with users that have provided (e.g., uploaded, exported, etc.) dimension widening rules to analytics system 110. In one implementation, dimension widening module 214 forms a table of data elements in which the row key is a concatenation of an account ID, log number, data source ID, or other identification that allows dimension widening module 214 to identify one or more dimension widening rules that apply to the data elements.

Dimension widening module 214 may apply the dimension widening rules to the data elements in the list or table. Since the data elements in the list or table are collocated, dimension widening module 214 may load the dimension widening rules once and apply the rules as a batch process to the multiple data entries. Dimension widening module 214 may be configured to load a maximum number of data elements from staging database 232 in an attempt to fill a pre-defined memory pool (e.g., a memory device or portion thereof having a pre-defined storage capacity). The maximum number of data elements may be based on the size (i.e., storage capacity) of the memory pool. Advantageously, dimension widening module 214 may perform batch lookup and join operations on the data elements in the memory pool. Such an approach may guarantee that the performance of the dimension widening process is proportional to the amount of memory available (e.g., the more memory, the faster the process).

Dimension widening module 214 may be configured to scan each data element in the list or table and to identify data elements having a dimension associated with one or more dimension widening rules. The data element may generally include keys or a concatenation of keys such as "account_id," "log_number," and "visitor_id" as mentioned above that identify the data element. Since the data in the list or table is collocated, consecutive data entries are likely to have similar keys and are likely to belong to the same web property. Dimension widening module 214 may load dimension widening rules associated with the web property. Advantageously, dimension widening module 214 may only need to load such rules only once for all data elements including the same web property.

In one implementation, applying the dimension widening rules to a data element may include defining a previously undefined dimension of the data element based on the rules, and adding the dimension to the data element. For example, if the data element includes a "product_code" dimension but not a "product_name" dimension, the "product_name" dimension and corresponding value may be added to the data element.

In one implementation, applying the dimension widening rules to a data element may include changing a previously defined dimension of the data element based on the rules. For example, if the data element includes a "product_name" dimension with a value that differs from the value specified by the dimension widening rule, the "product_name" dimension for the data element may be changed (e.g., if product_name=ABC, set product_name=XYZ).

Dimension widening module 214 may store processed (e.g., dimension-widened) data elements in web hits database 230. In some implementations, the processed data elements may be stored in web hits database 230 along with the data elements which did not require dimension widening and which were originally stored in web hits database by data sorting module 212. The data stored in web hits database 230 may be subsequently accessed by reporting module 222 to generate reports.

In some implementations, the data elements are processed asynchronously to avoid significant overhead of loading dimension widening rules. Some dimension widening rules may be large and processing of the data elements may be time consuming. Advantageously, dimension widening module 214 may be configured to process data elements including the same web property together, which reduces the overhead and limits potential high latency. In an alternative implementation, the data elements may be processed synchronously.

Analytics system 110, and more specifically modules 210-214, may facilitate the processing of data elements for reporting. Modules 210-214 may generally be used to process data elements received by analytics system 110 as the data elements are received (i.e., non-retroactively, in an ad-hoc manner, etc.). In some implementations, analytics system 110 may be configured to pre-process and pre-aggregate some data into pre-defined reports, to reduce latency at the time a query (e.g., a request for a report) is received.

Still referring to FIG. 2, analytics system 110 is shown to include an aggregation module 220. Data ready for use by reporting module 222 may be stored in web hits database 230 as described above. Aggregation module 220 may periodically aggregate the data elements stored in web hits database 230 and store the aggregated data elements in aggregation database 236. Reporting module 222 may use data elements stored in one or both of web hits database 230 and aggregation database 236 for generating reports.

In one implementation, data may be stored in aggregation database 236 for a specified amount of time. For example, aggregation database 236 may be backfilled with up to one year's worth of data (e.g., data elements received in the last calendar year) or with data from any other time period. The data elements may include a timestamp or other indicator relating to time-based information.

In some implementations, analytics system 110 may receive new dimension widening rules after the data elements have already been received. The new dimension widening rules may apply to the data elements stored in web hits database 230 and/or aggregation database 236. Analytics system 110 may be generally configured to apply the new dimension widening rules to the raw data elements stored in web hits database 230 and the aggregated data elements stored in aggregation database 236. In other words, the new dimension widening rules are applied to historical data retroactively. Advantageously, the dimension widening rules may be applied to the data elements such that the original data and the and aggregated data are not overwritten or compromised.

Still referring to FIG. 2, memory 206 is shown to include a retroactive dimension widening module 216. Retroactive dimension widening module 216 may perform a backend, task manager based process to periodically check (e.g., every five minutes) for new dimension widening rules in dimension widening rule database 234 (or may receive such an indication from a module of analytics system 110). In some implementations, the new dimension widening rules may apply to data elements in both web hits database 230 and aggregation database 236. For example, data elements stored in both web hits database 230 and aggregation database 236 may satisfy one or more of the rule conditions.

Retroactive dimension widening module 216 may be configured to identify stored data elements to which the new dimension widening rules apply and retroactively apply dimension widening rules to the identified data elements. In one implementation, when new dimension widening rules are received by data import module 210, analytics system 110 may be configured to apply the rules to both aggregated data (via module 216) and data yet to be processed (via module 214 or module 216). In another implementation, the rules may be only applied to data elements in aggregation database 236.

Retroactive dimension widening module 216 may be configured to identify data in web hits database 230 for which the new dimension widening rules apply. Such data may be the latest data received by analytics system 110 (e.g., data from the last one or two days) that are not yet covered by the aggregate database 236. The identified data elements in web hits database 230 may be either already processed data (e.g., previously dimension-widened data) or data not processed by dimension widening module 214 (e.g., data determined by data sorting module to not require dimension widening based on the dimension widening rules in effect at the time the data was received).

Retroactive dimension widening module 216 may be configured to apply the new dimension widening rules similarly to the functionality of dimension widening module 214. However, instead of overwriting the previous dimensions of the data element being processed, retroactive dimension widening module 216 is configured to generate a "dimension widening delta" for each processed data element. The dimension widening delta may be a second set of dimensions associated with the data element. In some implementations, the dimension widening delta may include only the dimensions added or modified by the new set of dimension widening rules. Advantageously, by not overwriting the previous dimensions of the data elements, the raw data originally sent to analytics system 110 may be preserved.

The dimension widening deltas may be stored in a new column alongside the data used to generate the dimension widening deltas. For example, dimension widening deltas generated from data stored in web hits database 230 may be stored in a new column of database 230. Dimension widening deltas generated from data stored in aggregation database 236 may be stored in a new column of aggregation database 236. The dimension widening delta for a data element may be stored separately from the other set of dimensions of the data element. Advantageously, the delta aggregates may be generated without re-aggregation of the already aggregated data.

In one implementation, dimension widening rule database 234 may be configured to add a new column to each entry, indicating that the dimension widening rule is a rule to be applied retroactively to data elements. Further, data import module 210 may be configured to distinguish between retroactive dimension widening rules and "regular" dimension widening rules.

Still referring to FIG. 2, memory 206 is shown to include an extraction/merging module 218. Extraction/merging module 218 may be configured to merge dimensions associated with a data element in aggregation database 236 or web hits database 230. When reporting module 222 receives a request to generate a report, extraction/merging module 218 may determine whether the query contains dimensions from the new dimension widening rules. If so, extraction/merging module 218 may retrieve the delta aggregates and the original dimensions of the relevant data elements. Extraction/merging module 218 may be configured to join the delta aggregates and the original dimensions for use by reporting module 222. In some implementations, extraction/merging module 218 does not modify the data elements in database 230 or 236 and uses the merged data only for reporting purposes. The underlying data may be preserved. Again, the processing of the data elements in aggregation database 236 and/or web hits database 230 by retroactive dimension widening module 216 may be performed prior to the receipt of the query request from a user, thereby reducing query latency.

In one implementation, retroactive dimension widening module 216 may be configured to apply the dimension widening rules to data elements based on the time the data elements were received. For example, retroactive dimension widening module 216 may apply the new dimension widening rules in a time-reverse order. Retroactive dimension widening module 216 may first apply the new dimension widening rules to the most recent data in aggregation database 236 and work backwards in time through the other data elements. Advantageously, this ordering may expedite the processing of the most recent data elements, which may be the most likely data to be requested by a customer in generating an analytical report.

Further, retroactive dimension widening module 216 may allow for time-based keys or conditions to be included in the dimension widening rules. For example, one key of the dimension widening rules provided by a user may relate to a period of time, such as a number of hours, days, weeks, months, years, etc. Using the keys or conditions relating to time, retroactive dimension widening module 216 may apply the dimension widening rules to only data elements within a predetermined time period. The keys or conditions may identify a time in the past or a time in the future (e.g., a future time that when passed, module 216 may then go back to process data elements in aggregation database 236 within the defined time period).

With the use of modules 216-220 for retroactively applying dimension widening rules, analytics system 110 may pre-aggregate data for reporting purposes. Since the pre-aggregated data may be processed using the dimension widening rules retroactively, analytics system 110 may continue to generate pre-aggregated data for reporting purposes in order to reduce query latency. Since the majority of data joining (e.g., the combining of the delta aggregates with the original dimension values) occurs during processing and not at query time, there may be no limitation on data size. In other words, there may be no limit to the number of dimension widening rules that a user may provide.

In one implementation, analytics system 110 may not support retroactive application of dimension widening rules, and analytics system 110 may not include aggregation database 236 and modules 216-220.

Memory 206 is further shown to include a reporting module 222. Reporting module 222 may be configured to generate an analytical report (either upon request or on a schedule) for a user (e.g., a content provider, third-party source, etc.) based on data stored in web hits database 230 or aggregation database 236. In one implementation, reporting module 222 may use data in web hits database 230 and aggregate the data. In another implementation, the data may be aggregated into aggregation database 236 (by aggregation module 220) prior to generation of the report. When a user requests a report, the report generation may occur quickly, without having to process data elements (e.g., to perform dimension widening on the data elements) in order for the data elements to be usable in the report. The data stored in databases 230, 236 are used instead of the unprocessed data elements in staging database 232. In other words, for data included in the report, the processing of the data elements by applying dimension widening rules occurs prior to receiving the report request.

The request to generate the report may include a plurality of identified dimensions. Reporting module 222 may be configured to select a subset of the data elements stored in web hits database 230 or aggregation database 236 by selecting data elements including each of the plurality of identified dimensions.

Analytics module 110 may be configured to support various types of dimensions and metrics as part of the dimension widening process. For example, dimensions and metrics may be webpage related (e.g., a dimension relating to a uniform resource identifier (URI), host name, or page title), campaign related (e.g., a dimension relating to a source of a content item, a medium in which the content item is presented, a content group associated with the content item, one or more keywords, a referral path, a campaign ID, a content group ID, etc.), transaction related (e.g., a dimension relating to a transaction ID, currency code, affiliation, etc.), item related (e.g., a dimension relating to a product name, code, variation, or price), browser related (e.g., a dimension relating to a browser, browser version, platform, or platform version on which a content item is displayed, a language of the content item, a screen resolution or screen colors on which the content item is displayed, if the content item is java enabled, a flash version needed to display the content item, etc.), geo data related (e.g., a dimension related to a domain or organization associated with the website), or application related (e.g., a dimension relating to an app name, version, or ID). Custom dimensions or metrics may further be supported (e.g., custom dimensions defined by a user or customer, metrics relating to performance of a content item, etc.).

Figure 3:
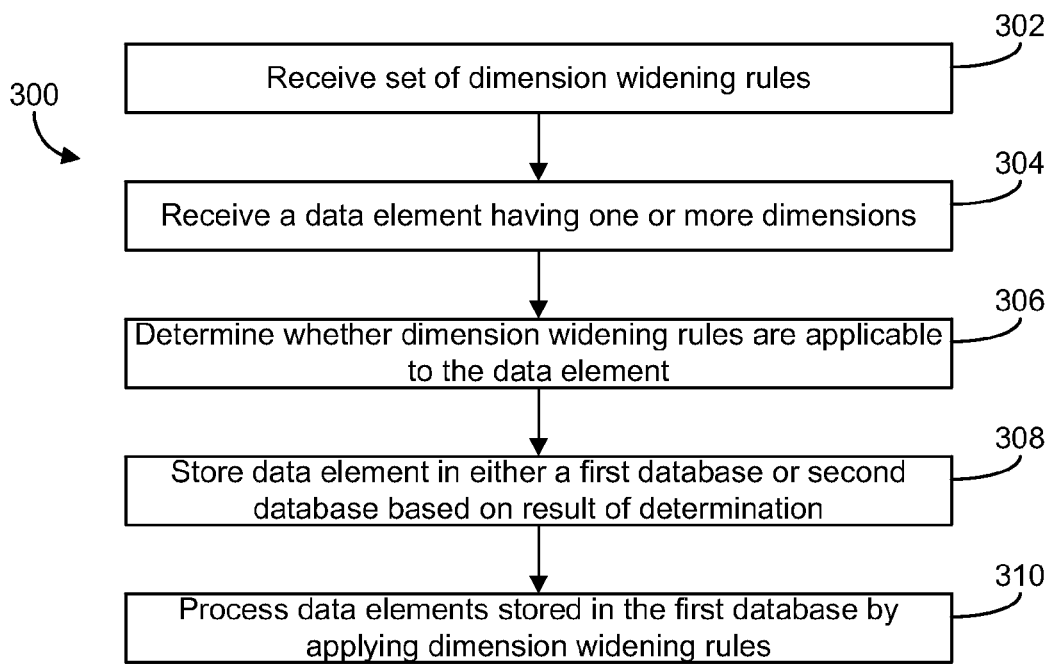
FIG. 3 is a flow chart of a process for performing dimension widening on a data element by the analytics system, according to a described implementation.

Referring to FIG. 3, a flow chart of a process 300 for performing dimension widening on a data element by an analytics system is shown, according to a described implementation. Process 300 may be executed by, for example, an analytics system 110 configured to generate a report for a user based on processed data elements. Process 300 may generally include receiving dimension widening rules and data elements, determining which data elements are to be processed by applying dimension widening rules, and processing the data elements. The data elements may generally relate to content items presented to a user via a resource.

Process 300 includes receiving a set of dimension widening rules (step 302). Each dimension widening rule includes one or more conditions and one or more actions. Each condition may correspond with a dimension such that if a dimension of a data element matches the condition, then the dimension widening rule should be applied to the data element. Each action may correspond with a dimension such that either a new dimension is created for the data element with a new value, or that a value of an existing dimension of the data element should be changed to a new value. The dimension widening rules may be received, processed, and stored in a dimension widening rule database. Advantageously, an unlimited number of dimension widening rules may be received and stored.

Process 300 includes receiving a data element having one or more dimensions (step 304). The one or more dimensions may relate to a property associated with the data element. For example, dimensions associated with a data element may include a product code, product name, or any metric related to content item performance associated with the data element.

Process 300 includes determining whether dimension widening rules are applicable to the data element (step 306). A dimension widening rule may be applicable to the data element if one or more dimensions of the data element satisfy one or more of the conditions of the dimension widening rule. For example, a data element having a product code dimension which matches a condition of a dimension widening rule may be identified as a data element upon which to perform dimension widening.

Process 300 includes storing the data element in either a first database or second database based on the result of the determination (step 308). For example, if a dimension widening rule is applicable to the data element, the data element is stored in the first database (e.g., a staging database). If none of the dimension widening rules are applicable to the data element, the data element is stored in the second database (e.g., a web hits database).

Process 300 includes processing the data elements stored in the first database by applying the dimension widening rules (step 310). The application of the dimension widening rules to the data elements may include performing the one or more actions associated with the dimension widening rules applicable to the data element. For example, step 310 may include changing a value of a dimension of the data element or adding a dimension and associated value to the data element. The data elements stored in the first database are processed independently of the data elements stored in the second database.

Upon completion of process 300, the data elements stored in the first database may be used by a reporting module to generate a report for a user. The processes data elements may be stored in the second database after processing, in one implementation.

Figure 4:
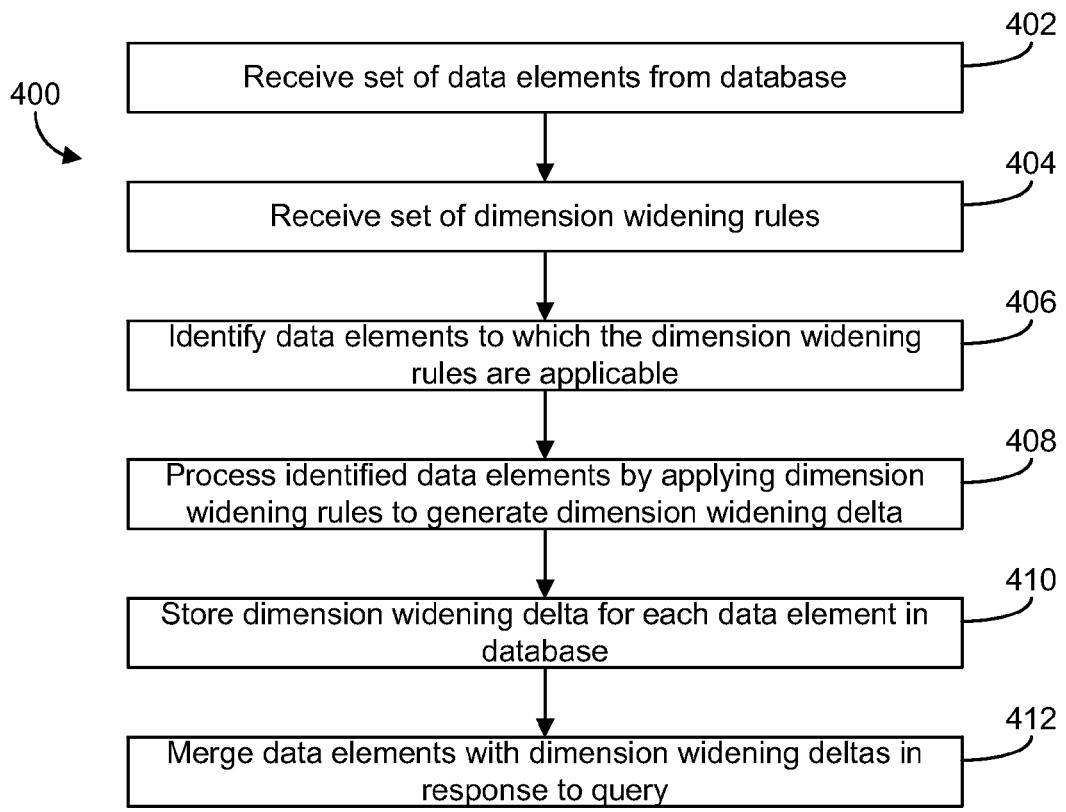
FIG. 4 is a flow chart of a process for retroactively performing dimension widening on a set of data elements by the analytics system, according to a described implementation.

Referring to FIG. 4, a flow chart of a process 400 for retroactively performing dimension widening on a set of data elements by the analytics system is shown, according to a described implementation. Process 400 may be executed by, for example, an analytics system 110 configured to generate a report for a user based on processed data elements. Process 400 may generally include receiving dimension widening rules and data elements, determining which data elements are to be processed by applying dimension widening rules, and processing the data elements. The dimension widening rules may be applied retroactively to the data elements and merged in response to a query.

Process 400 includes receiving a set of data elements from a database (step 402). The set of data elements may be from an aggregation database in which the data elements have already been aggregated, or may be data elements from a web hits database in which the data elements have been processed but not aggregated. The set of data elements may have one or more dimensions.

Process 400 includes receiving a set of dimension widening rules (step 404). The dimension widening rules may generally include one or more conditions and one or more actions. The dimension widening rules may be rules that are to be applied retroactively to data elements (e.g., to be applied to data elements already processed and/or aggregated). In one implementation, the dimension widening rules may include an indication that the rules are to be applied retroactively to data elements. Step 404 may include marking the dimension widening rules with a flag or other indicator that indicates that the rules need to be applied retroactively to the data elements.

Process 400 includes identifying data elements to which the dimension widening rules are applicable (step 406). A dimension widening rule may be applicable to the data element if one or more dimensions of the data element satisfy one or more of the conditions of the dimension widening rule. For example, a data element whose product code matches a condition of a dimension widening rule may be identified as a data element to perform dimension widening. The identified data elements may either be aggregated data from an aggregation database or non-aggregated data from a web hits database, according to one implementation. Step 406 may generally include identifying one or more data elements from the aggregation database and web hits database.

Process 400 includes processing identified data elements by applying the dimension widening rules to generate a dimension widening delta (step 408). Step 408 may include, for aggregated data, applying the dimension widening rules in reverse chronological order (e.g., processing the newest data first). Step 408 may further include, for non-aggregated data, applying the dimension widening rules to data from a recent time frame (e.g., the last one or two days).

Process 400 includes storing the dimension widening delta for each data element in a database (step 410). The dimension widening delta for each data element is stored separately from the data element in the database. For data elements in the aggregated database, the dimension widening delta may be stored separately in the same database, and similarly for the data elements in the web hits database. Step 410 may additionally include clearing a flag or other indicator associated with the dimension widening rules, indicating that the rules have been applied.

Process 400 includes merging data elements with dimension widening deltas in response to a query (step 412). When the analytics system receives a query, the dimension widening deltas may be merged with the original dimensions of the data elements such that the resulting dimensions are usable by a reporting module of the analytics system.

Process 400 may further include initial steps of processing a set of raw data elements to generate a set of aggregates and storing the set of aggregates in an aggregation database separate from other data elements in another database. Additional raw data elements may further be received and stored in the other database. These steps may occur at any time prior to the activities of process 400 (e.g., before a new set of dimension widening rules is received in step 404).

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any computer-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising computer-readable media for carrying or having computer-executable instructions or data structures stored thereon. Such computer-readable media can be any available media that can be accessed by a general purpose or special purpose computer or other machine with a processor. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. In some implementations, computer-readable media include only non-transitory media (e.g., excluding propagating signals). Combinations of the above are also included within the scope of computer-readable media. Computer-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computer-implemented method for retroactively performing dimension widening on a data element for use in an analytical report, the method comprising:
   receiving, at a processing circuit, a set of data elements from a database, each of the data elements having a first dimension;
   receiving, at a processing circuit, a set of dimension widening rules, each of the dimension widening rules including a condition and an action;
   identifying, by the processing circuit, a first set of the data elements to which any of the dimension widening rules are applicable, wherein a dimension widening rule is applicable to a data element if the first dimension of the data element satisfies the condition of the dimension widening rule;
   processing, by the processing circuit, the first set of data elements by applying the applicable dimension widening rules to the first set of data elements, wherein the processing circuit generates a dimension widening delta comprising an added dimension different from the first dimension for each of the data elements of the first set of data elements by applying the applicable dimension widening rules, the dimension widening delta generated prior to receiving a query requesting the first dimension and the added dimension;
   storing the dimension widening deltas for each of the processed data elements in the database, wherein the dimension widening delta for a data element is stored separately from the data element in the database; and
   receiving the query requesting the first dimension and added dimension;
   merging the first dimension with the added dimension of the dimension widening delta in response to the query; and
   generating a response to the query using the merged first dimension and added dimension.

2. The method of claim 1, wherein the set of dimension widening rules includes a potentially unlimited number of dimension widening rules.

3. The method of claim 1, wherein each of the conditions and each of the first dimensions has a name and a value;
   wherein a dimension of a data element satisfies a condition of a dimension widening rule if the name of the data element dimension satisfies the name of the condition and the value of the data element dimension satisfies the value of the condition.

4. The method of claim 1, wherein the set of data elements is a set of aggregated data, wherein applying the dimension widening rules to the set of aggregated data generates delta aggregates, wherein the delta aggregates are stored separately from the aggregated data and are generated without reaggregating the aggregated data.

5. The method of claim 1, wherein the set of data elements is a set of raw data elements stored in a first database, the method further comprising:
   processing the set of raw data elements to generate a set of aggregates and storing the set of aggregates in a second database, separate from the first database; and
   receiving additional raw data elements and storing the additional raw data elements in the first database;
   wherein identifying the first set of the data elements to which any of the dimension widening rules are applicable includes identifying a set of the aggregates and a set of the additional raw data elements to which any of the dimension widening rules are applicable;
   wherein applying the applicable dimension widening rules to the first set of data elements includes applying the dimension widening rules to the set of identified aggregates and to the set of identified additional raw data elements, wherein the processing circuit generates a dimension widening delta for each of the processed aggregates and for each of the processed additional raw data elements;
   wherein storing the dimension widening deltas for each of the processed data elements includes storing the dimension widening deltas for the additional raw data elements in the first database and storing the dimension widening deltas for the aggregates in the second database.

6. The method of claim 1, wherein processing the first set of data elements by applying the dimension widening rules to the first set of data elements occurs prior to receiving the query requesting the first dimension and the added dimension.

7. The method of claim 1, wherein at least one condition of the set of dimension widening rules specifies a time period;
wherein identifying the a first set of the data elements to which any of the dimension widening rules are applicable includes identifying data elements having a dimension within the specified time period.

8. The method of claim 1, wherein the received set of dimension widening rules include a retroactivity indicator, the method further comprising:
using the retroactivity indicator to determine whether the received set of dimension widening rules are to be applied retroactively to the set of data elements.

9. A system for retroactively performing, dimension widening on a data element for use in an analytical report, the system comprising a processing circuit configured to:
receive a set of data elements from a database, each of the data elements having a first dimension;
receive a set of dimension widening rules, each of the dimension widening rules including a condition and an action;
identify a first set of the data elements to which any of the dimension widening rules are applicable, wherein a dimension widening rule is applicable to a data element if the first dimension of the data element satisfies the condition of the dimension widening rule;
process the first set of data elements by applying the applicable dimension widening rules to the first set of data elements, wherein the processing circuit generates a dimension widening delta comprising an added dimension different from the first dimension for each of the data elements of the first set of data elements by applying the applicable dimension widening rules, the dimension widening delta generated prior to receiving a query requesting the first dimension and the added dimension:
store the dimension widening deltas for each of the processed data elements in the database, wherein the dimension widening delta for a data element is stored separately from the data element in the database; and
receive the query requesting the first dimension and added dimension: merge the first dimension with the added dimension of the dimension widening delta in response to the query; and
generate a response to the query using the merged first dimension and added dimension.

10. The system of claim 9, wherein the set of dimension widening rules includes a potentially unlimited number of dimension widening rules.

11. The system of claim 9, wherein each of the conditions and each of the dimensions has a name and a value;
wherein a dimension of a data element satisfies a condition of a dimension widening rule if the name of the data element dimension satisfies the name of the condition and the value of the data element dimension satisfies the value of the condition.

12. The system of claim 9, wherein the set of data elements is a set of aggregated data, wherein applying the dimension widening rules to the set of aggregated data generates delta aggregates, wherein the delta aggregates are stored separately from the aggregated data and are generated without reaggregating the aggregated data.

13. The system of claim 9, wherein the set of data elements is a set of raw data elements stored in a first database, the processing circuit further configured to:
process the set of raw data elements to generate a set of aggregates and storing the set of aggregates in a second database, separate from the first database; and
receive additional raw data elements and storing the additional raw data elements in the first database;
wherein identifying the first set of the data elements to which any of the dimension widening rules are applicable includes identifying a set of the aggregates and a set of the additional raw data elements to which any of the dimension widening rules are applicable;
wherein applying the applicable dimension widening rules to the first set of data elements includes applying the dimension widening rules to the set of identified aggregates and to the set of identified additional raw data elements,
wherein the processing circuit generates a dimension widening delta for each of the processed aggregates and for each of the processed additional raw data elements;
wherein storing the dimension widening deltas for each of the processed data elements includes storing the dimension widening deltas for the additional raw data elements in the first database and storing the dimension widening deltas for the aggregates in the second database.

14. The system of claim 9, wherein processing the first set of data elements by applying the dimension widening rules to the first set of data elements occurs prior to receiving the query requesting the first dimension and the added dimension.

15. One or more non-transitory computer-readable media having instructions stored therein, the instructions being executable by one or more processors to cause the one or more processors to perform operations comprising:
receiving, at a processing circuit, a set of data elements from a database, each of the data elements having a first dimension;
receiving, at a processing circuit, a set of dimension widening rules, each of the dimension widening rules including a condition and an action;
identifying, by the processing circuit, a first set of the data elements to which any of the dimension widening rules are applicable, wherein a dimension widening rule is applicable to a data element if the first dimension of the data element satisfies the condition of the dimension widening rule;
processing, by the processing circuit, the first set of data elements by applying the applicable dimension widening rules to the first set of data elements, wherein the processing circuit generates a dimension widening delta comprising an added dimension different from the first dimension for each of the data elements of the first set of data elements by applying the applicable dimension widening rules, the dimension widening delta generated prior to receiving a query requesting the first dimension and the added dimension;
storing the dimension widening deltas for each of the processed data elements in the database, wherein the dimension widening delta for a data element is stored separately from the data element in the database; and
receiving the query requesting the first dimension and added dimension; merging the first dimension with the added dimension of the dimension widening delta in response to the query; and
generating a response to the query using the merged first dimension and added dimension.

16. The non-transitory computer-readable media of claim 15, wherein the set of dimension widening rules includes a potentially unlimited number of dimension widening rules.

17. The non-transitory computer-readable media of claim 15, wherein each of the conditions and each of the first dimensions has a name and a value;

wherein a dimension of a data element satisfies a condition of a dimension widening rule if the name of the data element dimension satisfies the name of the condition and the value of the data element dimension satisfies the value of the condition.

18. The non-transitory computer-readable media of claim 15, wherein the set of data elements is a set of aggregated data, wherein applying the dimension widening rules to the set of aggregated data generates delta aggregates, wherein the delta aggregates are stored separately from the aggregated data and are generated without reaggregating the aggregated data.

19. The non-transitory computer-readable media of claim 15, wherein the set of data elements is a set of raw data elements stored in a first database, the method further comprising:

processing the set of raw data elements to generate a set of aggregates and storing the set of aggregates in a second database, separate from the first database; and receiving additional raw data elements and storing the additional raw data elements in the first database;

wherein identifying the first set of the data elements to which any of the dimension widening rules are applicable includes identifying a set of the aggregates and a set of identified additional raw data elements to which any of the dimension widening rules are applicable;

wherein applying the applicable dimension widening rules to the first set of data elements includes applying the dimension widening rules to the set of identified aggregates and to the set of identified additional raw data elements, wherein the processing circuit generates a dimension widening delta for each of the processed aggregates and for each of the processed additional raw data elements;

wherein storing the dimension widening deltas for each of the processed data elements includes storing the dimension widening deltas for the additional raw data elements in the first database and storing the dimension widening deltas for the aggregates in the second database.

20. The non-transitory computer-readable media of claim 15, wherein processing the first set of data elements by applying the dimension widening rules to the first set of data elements occurs prior to receiving the query requesting the first dimension and the added dimension.

* * * * *